United States Patent
Kokubo et al.

(10) Patent No.: US 11,376,732 B2
(45) Date of Patent: Jul. 5, 2022

(54) ROBOT SYSTEM FOR CORRECTING TEACHING OF ROBOT USING IMAGE PROCESSING

(71) Applicant: FANUC CORPORATION, Yamanashi (JP)

(72) Inventors: Kyouhei Kokubo, Yamanashi (JP); Fumikazu Warashina, Yamanashi (JP)

(73) Assignee: FANUC CORPORATION, Yamanashi (JP)

(*) Notice: Subject to any disclaimer, the term of this patent is extended or adjusted under 35 U.S.C. 154(b) by 534 days.

(21) Appl. No.: 16/270,600

(22) Filed: Feb. 8, 2019

(65) Prior Publication Data
US 2019/0299403 A1 Oct. 3, 2019

(30) Foreign Application Priority Data
Mar. 27, 2018 (JP) .............................. JP2018-060088

(51) Int. Cl.
*B25J 9/16* (2006.01)
*B25J 15/06* (2006.01)
*B25J 15/10* (2006.01)

(52) U.S. Cl.
CPC ............. *B25J 9/163* (2013.01); *B25J 9/1664* (2013.01); *B25J 9/1697* (2013.01); *B25J 15/0616* (2013.01); *B25J 15/10* (2013.01)

(58) Field of Classification Search
CPC ...... B25J 9/163; B25J 9/1697; B25J 15/0616; B25J 15/10; B25J 9/1664; B25J 9/0081; B25J 19/04; B25J 13/08; B25J 9/1628; B25J 9/1679; B25J 9/161; G06T 7/73
See application file for complete search history.

(56) References Cited

U.S. PATENT DOCUMENTS

| 6,771,808 | B1 | 8/2004 | Wallack |
| 2010/0274390 | A1 | 10/2010 | Walser et al. |
| 2016/0039096 | A1* | 2/2016 | Wallack .................... G06T 7/80 |
| | | | 702/104 |
| 2016/0059419 | A1* | 3/2016 | Suzuki .................. B25J 9/1697 |
| | | | 700/114 |
| 2017/0109856 | A1 | 4/2017 | Inazumi et al. |

FOREIGN PATENT DOCUMENTS

| DE | 112011101730 B4 | 3/2016 |
| DE | 102015015094 A1 | 6/2016 |
| EP | 2227356 A1 | 9/2010 |
| EP | 2993002 A1 | 3/2016 |
| JP | S63105893 A | 5/1988 |
| JP | H2276725 A | 11/1990 |
| JP | 2005305613 A | 11/2005 |
| JP | 2006224291 A | 8/2006 |
| JP | 2014109466 A | 6/2014 |
| JP | 2015-112654 A | 6/2015 |

* cited by examiner

Primary Examiner — Basil T. Jos
(74) Attorney, Agent, or Firm — Hauptman Ham, LLP (57) ABSTRACT

A robot system includes a target position calculation section which calculates, when a first feature can be detected from an image, a target position of a robot based on the calculated position of the first feature and a stored first positional relationship, and calculates, when the first feature cannot be detected from the image and a second feature can be detected from the image, a target position of the robot based on the calculated position of the second feature and the stored first positional relationship.

9 Claims, 8 Drawing Sheets

ROBOT SYSTEM FOR CORRECTING TEACHING OF ROBOT USING IMAGE PROCESSING

RELATED APPLICATIONS

The present application claims priority of Japanese Application Number 2018-060088, filed on Mar. 27, 2018, the disclosure of which is hereby incorporated by reference herein in its entirety.

BACKGROUND OF THE INVENTION

1. Field of the Invention

The present invention relates to a robot system, and in particular, relates to a robot system for correcting the teaching of a robot using image processing.

2. Description of Prior Art

Conventionally, a technology in which a workpiece is imaged by an imaging device, features of the workpiece are detected from the acquired image, a position (i.e., a target position of a robot) at which a robot extracts the workpiece is calculated from the detection results, a teaching position of the robot is corrected, and the robot extracts the workpiece has been known.

The following document is known as prior art related to the present application. Japanese Unexamined Patent Publication (Kokai) No. 2015-112654 discloses a robot system including an image recognition unit which receives a captured image of a workpiece and a marker, and an operation unit which generates teaching data of a robot, wherein the operation unit generates first teaching data of the robot from the captured image received by the image recognition unit and generates second teaching data of the robot by gripping the workpiece with a gripping portion of the robot.

SUMMARY OF THE INVENTION

In the technology for correcting the teaching of a robot using image processing, in some cases, the features of a workpiece cannot be detected from an image due to individual differences in features of workpiece or obfuscation of the features of the workpiece. Conversely, if such technology is not used, it is necessary to manually correct the teaching of the robot, whereby the efficiency of the teaching operation is reduced. Furthermore, in the teaching operation for such technology, since it is necessary to store templates image or the like of the features in advance, there is a problem in that the teaching operation becomes time-consuming.

A technology for simplifying the teaching of a robot while improving the detection rate of features of a workpiece has been demanded.

An aspect of the present disclosure provides a robot system, including a robot which performs an operation on a workpiece, a robot controller which controls the robot, and an imaging device which images the workpiece, wherein the robot system detects features of the workpiece from a captured image and corrects teaching of the robot based on detection results, the robot system further including a storage unit which stores, in advance, a first feature and a second feature of the workpiece, and a first positional relationship of at least one of a position of the first feature and a position of the second feature with a target position of the robot, a feature detection section which detects at least one of the first feature and the second feature from the captured image based on the stored first feature or second feature, a feature position calculation section which calculates the position of at least one of the detected first feature and second feature, and a target position calculation section which calculates, when the first feature can be detected from the image, the target position of the robot based on the calculated position of the first feature and the stored first positional relationship, and calculates, when the first feature cannot be detected from the image and the second feature can be detected from the image, the target position of the robot based on the calculated position of the second feature and the stored first positional relationship.

DETAILED DESCRIPTION

The embodiments of the present disclosure will be described in detail below with reference to the attached drawings. In the drawings, the same or equivalent constituent elements are assigned the same or equivalent reference numerals. Furthermore, the embodiments described below do not limit the technical scope of the inventions described in the claims or the meanings of the terms described therein.

Figure 1:
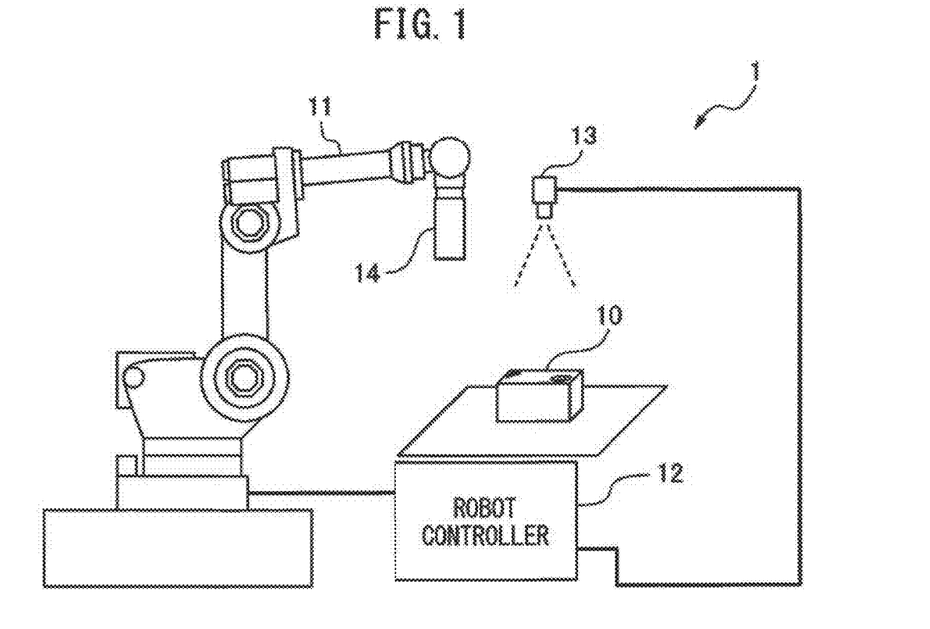
FIG. 1 is a schematic view showing a robot system according to a first embodiment.

FIG. 1 is a schematic view showing a robot system 1 according to a first embodiment. The robot system 1 includes a robot 11 which performs an operation on a workpiece 10, a robot controller 12 which controls the robot 11, and an imaging device 13 which images the workpiece 10.

The robot 11 is a six-axis robot manipulator driven by, for example, a servomotor or the like, and includes hand 14 which extracts the workpiece 10. The hand 14 includes a vacuum gripper using a vacuum pump or a magnetic force gripper using magnets. In another embodiment, the hand 14 may include finger members.

The robot controller 12 is wired or wirelessly communicatively connected to the robot 11, generates motion commands for the robot 11 in accordance with an operation program generated by the teaching operation, moves the robot 11, and performs speed, position, etc., feedback control. Furthermore, the robot controller 12 is wired or wirelessly communicatively connected to the imaging device 13, detects the features of the workpiece 10 from a captured image, obtains the position (and posture) at which the workpiece 10 is extracted by the robot 11 (i.e., the target position (and target posture) of the robot 11) based on the detected features, and corrects the teaching position (and teaching posture) of the robot 11.

The imaging device 13 is arranged on a structural column (not shown) and images the workpiece 10 from above. In another embodiment, the imaging device 13 may be arranged on an end effector of the robot 11.

Figure 2:
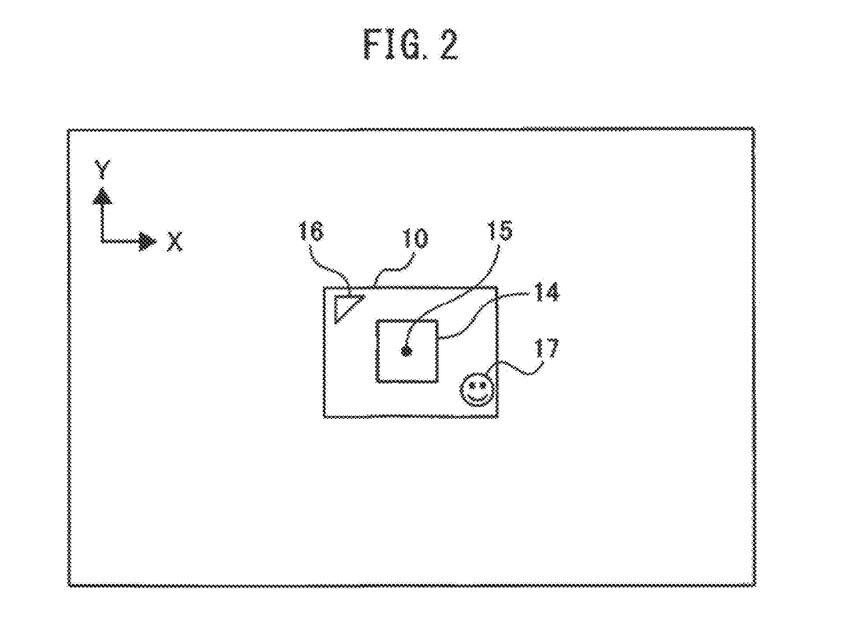
FIG. 2 is a view showing a captured image including a target position of a robot, and a first feature and second feature of a workpiece according to the first embodiment.

FIG. 2 is a view showing a captured image 18 including the target position 15 of the robot, and the first feature 16 and the second feature 17 of the workpiece 10 according to the first embodiment. Though the target position 15 of the robot is taught by the teacher on a captured image of a master workpiece and stored in advance as coordinate values, since the position of the actually extracted workpiece 10 changes, it is necessary to detect the features of the workpiece 10 from the captured image 18 using image processing, obtain the target position 15 of the robot from the detection results, and correct the teaching position.

However, in some cases, the features of the workpiece 10 cannot be detected from the captured image 18 due to individual differences in the features of workpiece 10 or obfuscation of the features of the workpiece 10. Thus, the robot system 1 prepares two types of features of the workpiece 10 (i.e., the first feature 16 and the second feature 17), and when the first feature 16 cannot be detected, the second feature 17 is detected, whereby the probability of detection failure is reduced.

Furthermore, in the robot system 1 according to the first embodiment, since the hand 14 includes a vacuum gripper or a magnetic force gripper, if the target posture of the robot is uniform, only the target position 15 of the robot may be obtained. However, in another embodiment in which the hand 14 includes finger members, since the posture at which the finger members of the hand 14 grip the workpiece 10 changes depending on changes in the posture of the actually extracted workpiece 10, it is necessary to also obtain the target posture of the robot.

Figure 3:
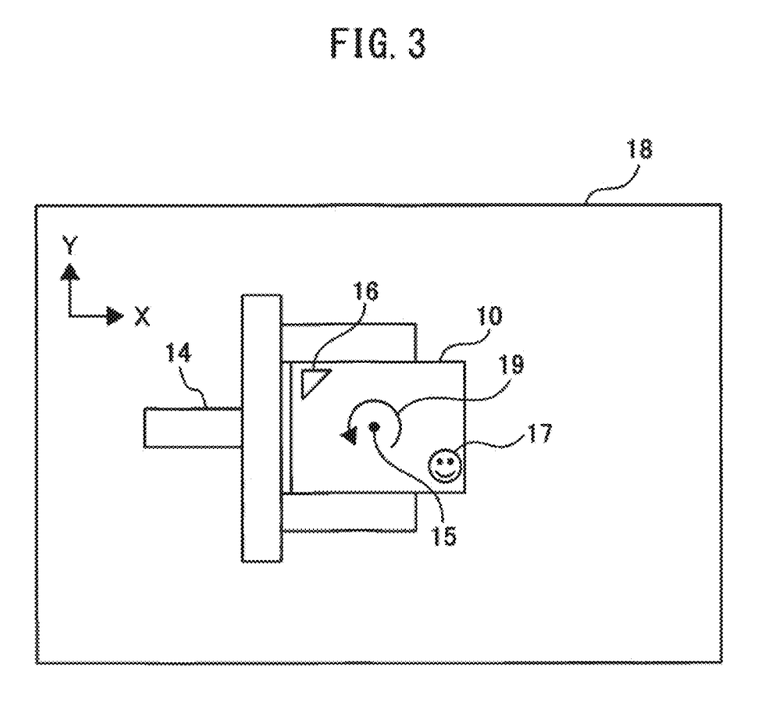
FIG. 3 is a view showing a captured image including a target position and target posture of a robot, and a first feature and second feature of a workpiece according to another embodiment.

FIG. 3 is a view showing a captured image 18 including the target position 15 and target posture 19 of the robot, and the first feature 16 and second feature 17 of the workpiece 10 according to another embodiment. Though the target posture 19 of the robot is taught by a teacher on a captured image of a master workpiece and is stored in advance as rotation angles about coordinate axes, since the posture of the actually extracted workpiece 10 changes, it is necessary to detect the features of the workpiece 10 from the captured image 18 using image processing, obtain the target posture 19 of the robot based on the detection results, and correct the teaching posture.

Figure 4:
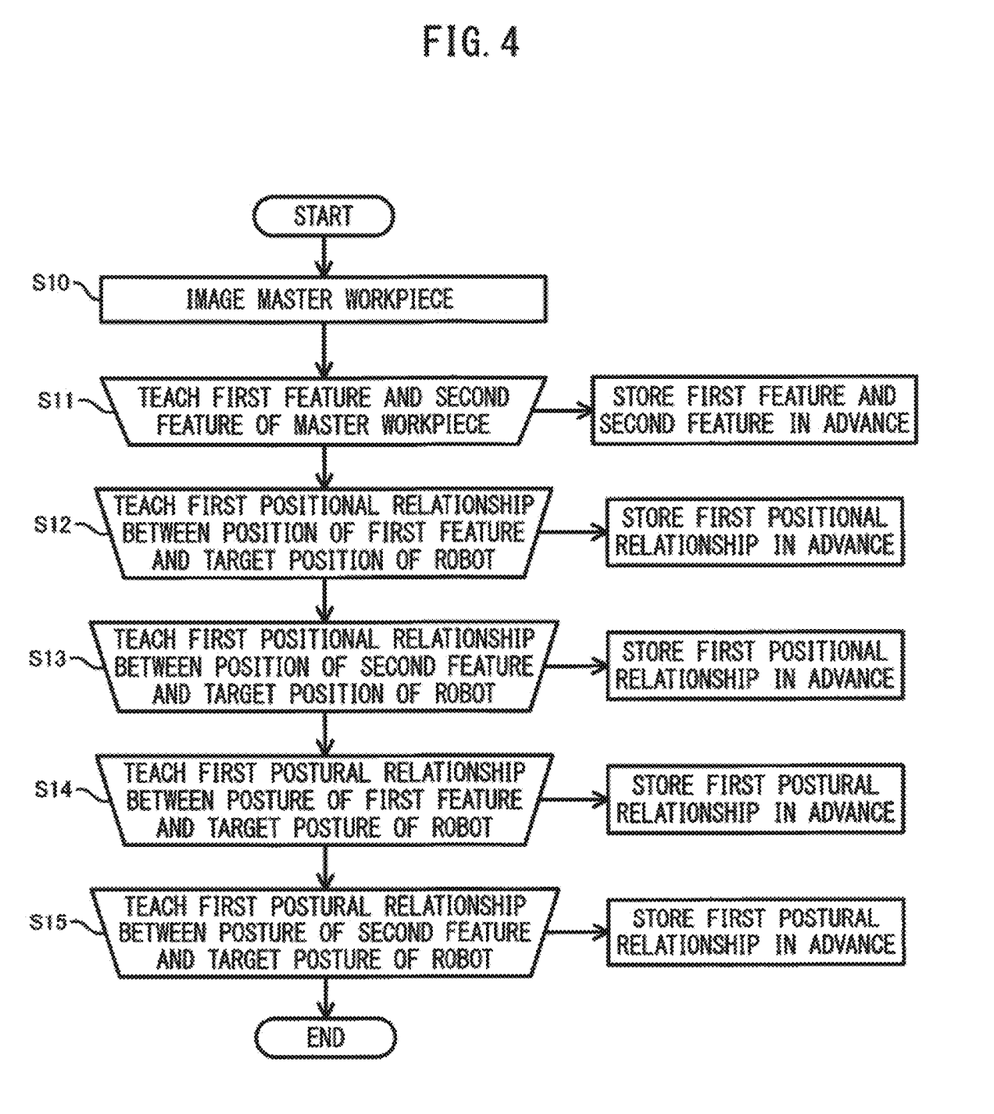
FIG. 4 is a flowchart showing a teaching operation of the robot system according to the first embodiment.

FIG. 4 is a flowchart showing the teaching operation of the robot system 1 according to the first embodiment. The robot system 1 in general performs the teaching operation by the following procedures.
<Teaching Operation>
(Step S10) Image a master workpiece.
(Step S11) Teach and store in advance the first feature and second feature on the captured image.
(Step S12) Teach and store in advance a first positional relationship between the position of the first feature and the target position of the robot.
(Step S13) Teach and store in advance the first positional relationship between the position of the second feature and the target position of the robot.

Note that "first positional relationship" means, for example, the coordinate values (150, 100, 0) of the target position of the robot when the position of the feature is taken as the origin (0, 0, 0) of the coordinates.

In another embodiment in which the hand includes finger members, the following teaching operations are subsequently performed.
(Step S14) Teach and store in advance the first postural relationship between the posture of the first feature and the target posture of the robot.
(Step S15) Teach and store in advance the first postural relationship between the posture of the second feature and the target posture of the robot.

Note that "first postural relationship" means, for example, the rotation angles (0°, 0°, 90°) of the target posture of the robot when the posture of the feature is taken as the rotation angles (0°, 0°, 0°) around the coordinate axes.

Figure 5:
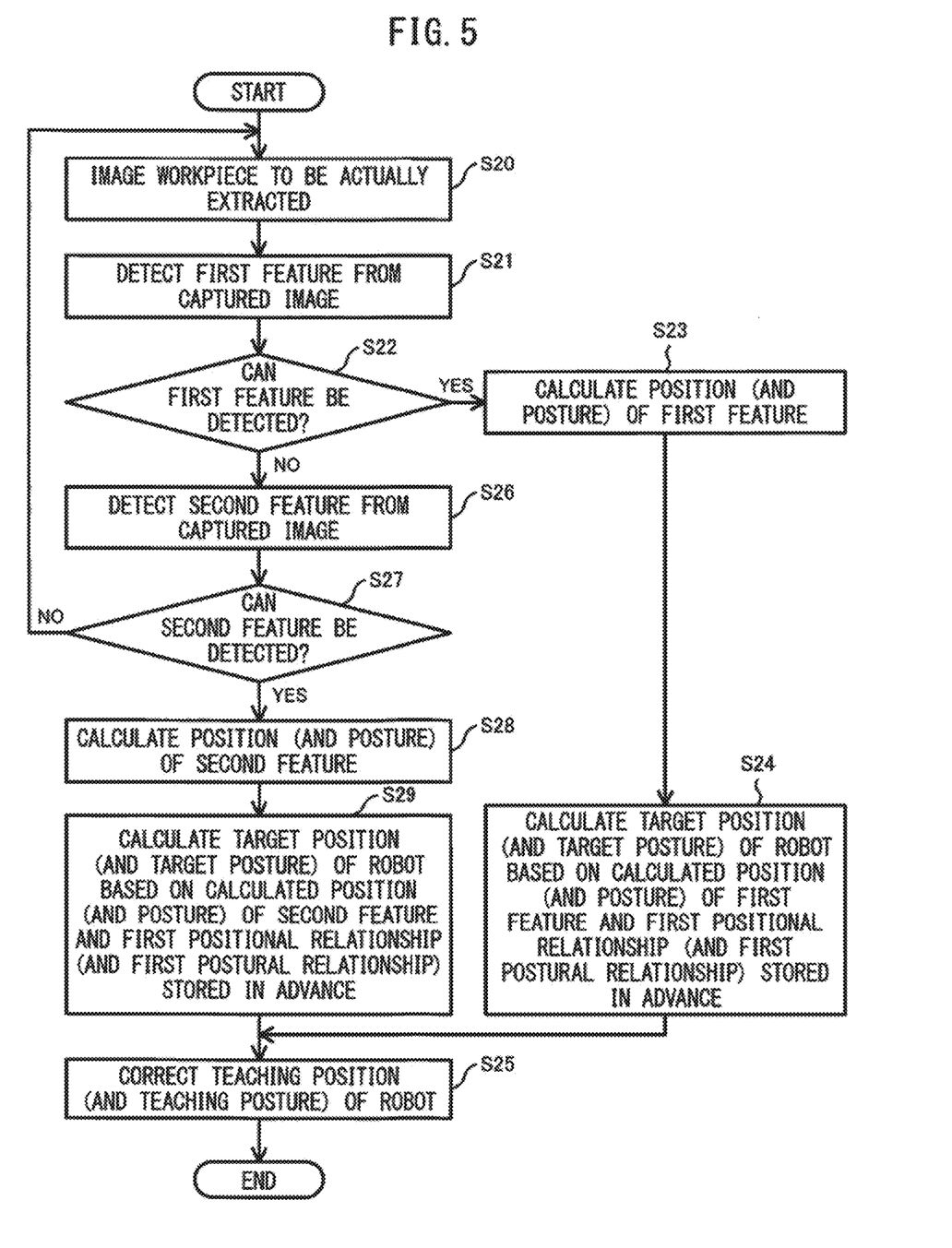
FIG. 5 is a flowchart showing a correction operation of the robot system according to the first embodiment.

FIG. 5 is a flowchart showing the correction operation of the robot system 1 according to the first embodiment. The robot system 1 performs the correction operation by substantially the following procedures. Note that in another embodiment in which the hand includes finger members, the operation is performed in consideration of not only "position" but also "posture".
<Correction Operations>
(Step S20) Image the workpiece to be actually extracted.
(Step S21) Detect the first feature from the captured image.
(Step S22) Determine whether or not the first feature can be detected from the captured image.
(Step S23) When the first feature can be detected from the captured image, calculate the position (and posture) of the first feature from the detection results.
(Step S24) Calculate the target position (and target posture) of the robot from the calculated position (and posture) of the first feature and the first positional relationship (and first postural relationship) stored in advance.
(Step S25) Correct the teaching position (and teaching posture) of the robot.
(Step S26) When the first feature cannot be detected from the captured image, detect the second feature from the captured image.
(Step S27) Determine whether or not the second feature can be detected from the captured image.
(Step S28) When the second feature can be detected from the captured image, calculate the position (and posture) of the second feature from the detection results.
(Step S29) Calculate the target position (and target posture) of the robot based on the calculated position (and posture) of the second feature and the first positional relationship (and first postural relationship) stored in advance.
(Step S25) Correct the teaching position (and teaching posture) of the robot.

In the <Correction Operation> according to the first embodiment in which a plurality of workpiece features are prepared, when one feature cannot be detected from the captured image, since the other feature is detected, the workpiece feature detection rate can be increased. Since it is not necessary to correct the robot teaching by a manual operation, the teaching of the robot can be simplified. However, when the number of types of workpieces increases, since it is necessary to teach and store in advance a plurality of image templates for the features and the first positional relationship (and first postural relationship) between the position (and posture) of the features and the target position (and target posture) of the robot for each workpiece, the <Teaching Operation> becomes more time-consuming. In a second embodiment, which is described later, the <Teaching Operation> is further reduced, whereby the teaching of the robot is simplified.

Figure 6:
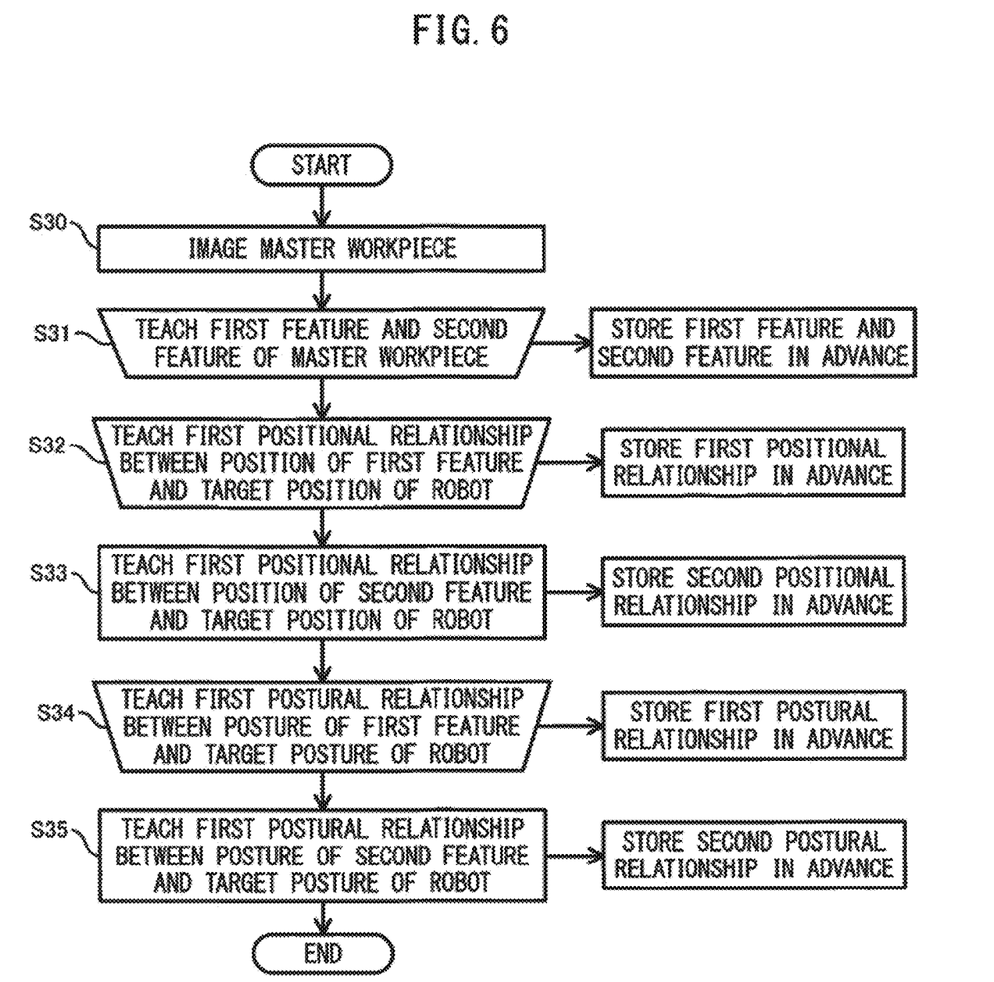
FIG. 6 is a flowchart showing a teaching operation of the robot system according to a second embodiment.

FIG. 6 is a flowchart showing the teaching operation of the robot system 1 according to the second, embodiment. The robot system 1 performs the teaching operation by substantially the following procedures.

<Teaching Operation>

(Step S30) Image the master workpiece.

(Step S31) Teach and store in advance the first feature and second feature on the captured image.

(Step S32) Teach and store in advance the first positional relationship between the position of the first feature and the target position of the robot.

(Step S33) Calculate and store in advance the second positional relationship between the position of the first feature and the position of the second feature.

Note that "second positional relationship" means, for example, the coordinates (150, 100, 0) of the position of the second feature when the position of the first feature is taken as the origin (0, 0, 0) of the coordinates.

In another embodiment in which the hand includes finger members, the following teaching operations are subsequently performed.

(Step S34) Teach and store in advance the first postural relationship between the posture of the first feature and the target posture of the robot.

(Step S35) Calculate and store in advance the second postural relationship between the posture of the first feature and the posture of the second feature.

Note that "second postural relationship" means, for example, the rotation angles (0°, 0°, 90°) of the posture of the second feature when the posture of the first feature is taken as the rotation angles (0°, 0°, 0°) around the coordinate axes.

Figure 7:
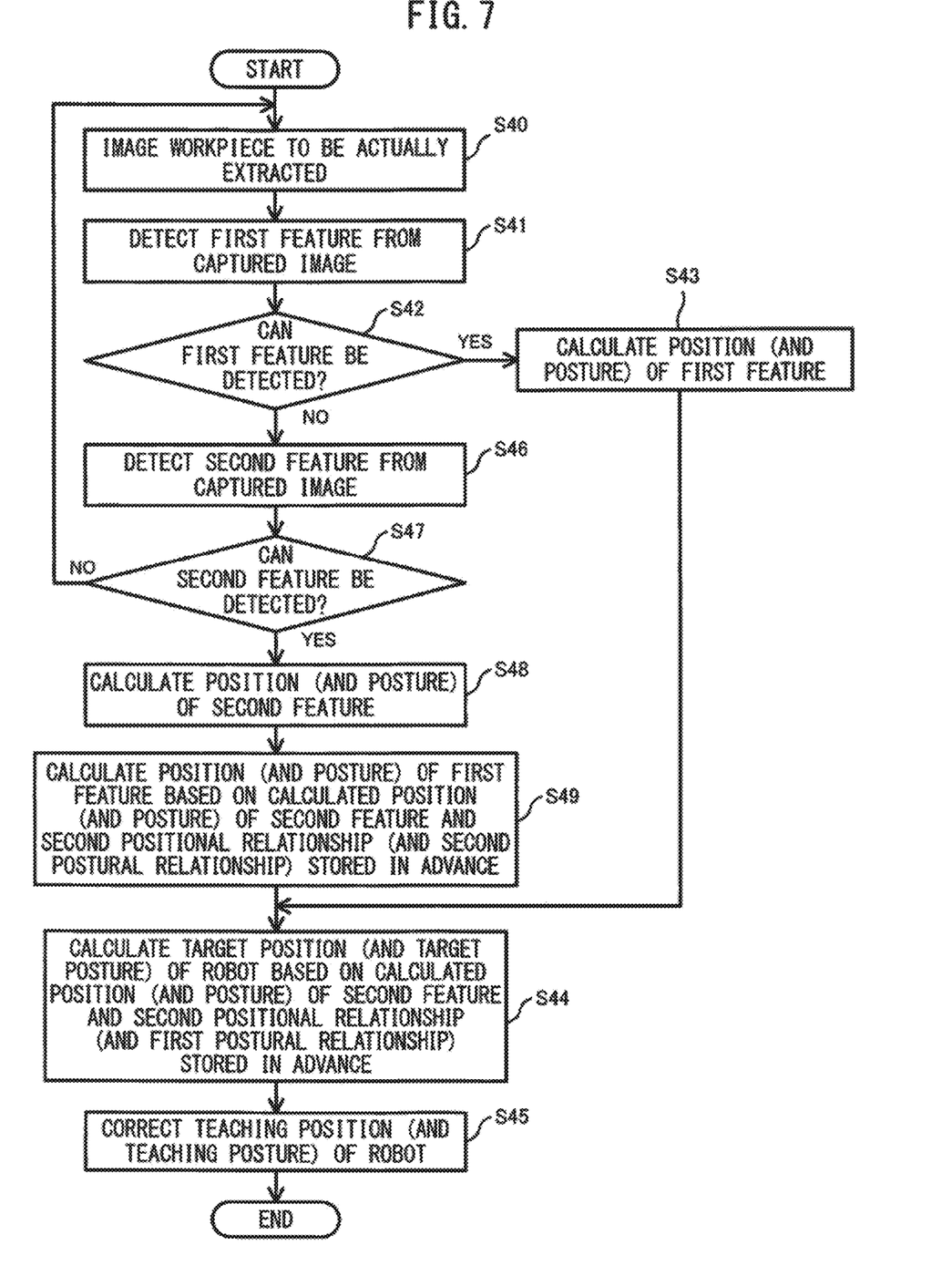
FIG. 7 is a flowchart showing a correction operation of the robot system according to the second embodiment.

FIG. 7 is a flowchart showing the correction operation of the robot system 1 according to the second embodiment. The robot system 1 performs the correction operation by substantially the following procedures. Note that in another embodiment in which the hand includes finger members, the operation is performed in consideration of not only "position" but also "posture".

<Correction Operation>

(Step S40) Image the workpiece to be actually extracted.

(Step S41) Detect the first feature from the captured image.

(Step S42) Determine whether or not the first feature can be detected from the captured image.

(Step S43) When the first feature can be detected from the captured image, calculate the position (and posture) of the first feature from the detection results.

(Step S44) Calculate the target position (and target posture) of the robot from the calculated position (and posture) of the first feature and the first positional relationship (and first postural relationship) stored in advance.

(Step S45) Correct the teaching position (and teaching posture) of the robot.

(Step S46) When the first feature cannot be detected from the captured image, detect the second feature from the captured image.

(Step S47) Determine whether or not the second feature can be detected from the captured image.

(Step S48) When the second feature can be detected from the captured image, calculate the position (and posture) of the second feature from the detection results.

(Step S49) Calculate the position (and posture) of the first feature based on the calculated position (and posture) of the second feature and the second positional relationship (and second postural relationship) stored in advance.

(Step S44) Calculate the target position (and target posture) of the robot from the calculated position (and posture) of the first feature and the first positional relationship (and first postural relationship) stored in advance.

(Step S45) Correct the teaching position (and teaching posture) of the robot.

In the <Teaching Operation> of the second embodiment, it is not necessary to teach the first positional relationship (and first postural relationship) between the position (and posture) of the second feature and the target posture (and target position) of the robot, and the second positional relationship (and second postural relationship) between the position (and posture) of the first feature and the position (and posture) of the second feature are automatically calculated and stored in advance. Thus, the time consumption of the <Teaching Operation> is further reduced, whereby the teaching of the robot is simplified.

Figure 8:
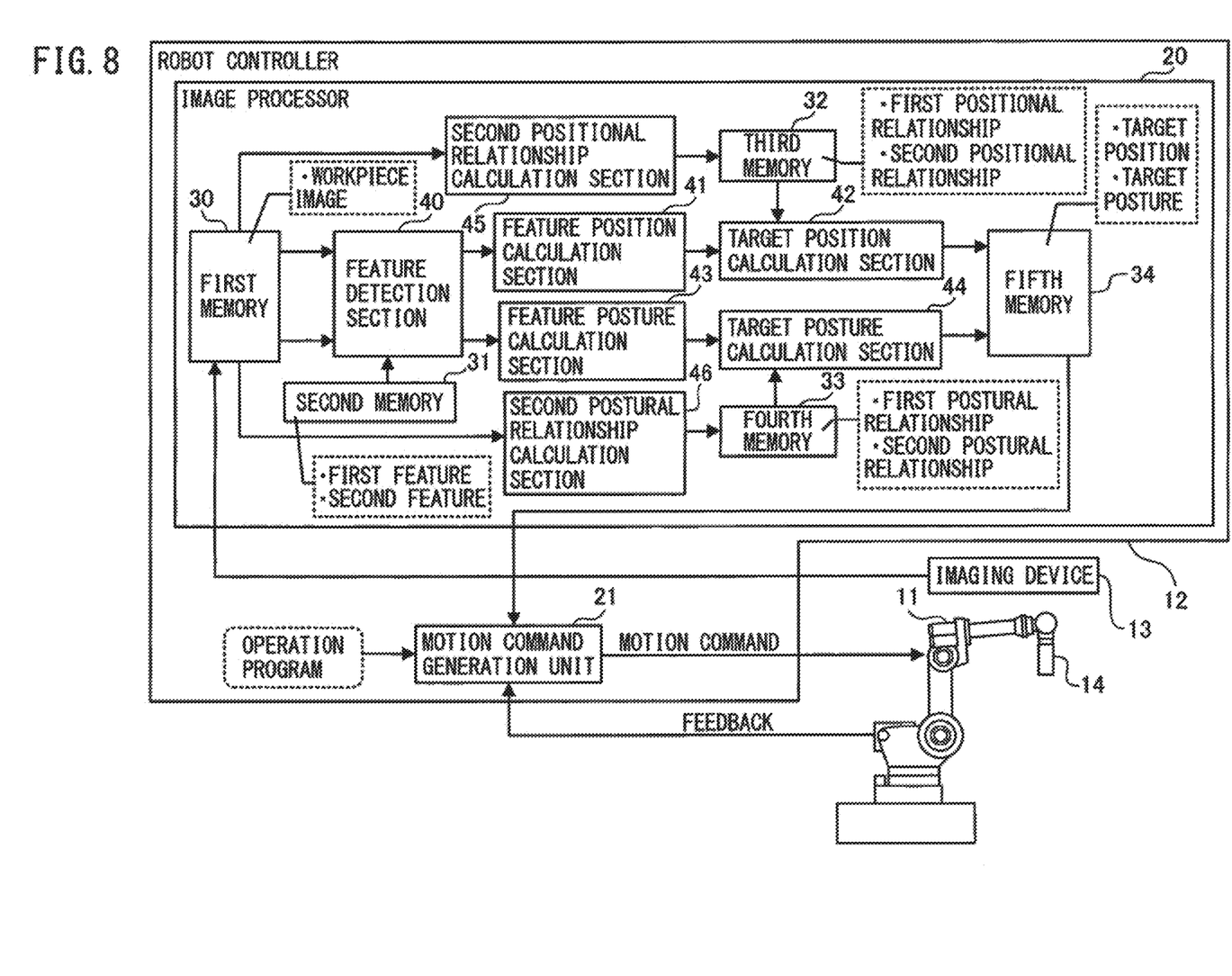
FIG. 8 is a block diagram showing the configuration of the robot system according to the second embodiment.

FIG. 8 is a block diagram showing the configuration of the robot system 1 according to the second embodiment. The robot system 1 according to the second embodiment includes a robot controller 12 which controls the robot 11. The robot controller 12 corrects the teaching of the robot 11 using image processing. Note that, in FIG. 8, though the robot controller 12 includes a configuration which performs operations in consideration of not only "position" but also "posture" so as to be able to accommodate the other embodiment in which the hand 14 includes finger members, the configuration for performing operations in consideration of "posture" is not indispensable.

The robot controller 12 includes an image processor 20 which calculating the target position and target posture of the robot 11 based on detection results of the features of the workpiece detected from the captured image, and a motion command generation unit 21 which generates motion commands for the robot 11 to correct the teaching position and the teaching posture in the operation program based on the calculated target position and target posture.

The image processor 20 includes a known CPU, ASIC, FPGA, etc. The image processor 20 includes a first memory 30 which stores a workpiece image acquired from the imaging device 13, a second memory 31 which stores, in advance, the first feature and second feature of the workpiece, a third memory 32 which stores, in advance, the first positional relationship and second positional relationship, a fourth memory 33 which stores, in advance, the first postural relationship and second postural relationship, and a fifth memory 34 which stores the calculated target position and target posture. Note that in the robot system 1 according to the first embodiment, it is not necessary to store the second positional relationship and the second postural relationship in advance.

The image processor 20 further includes a feature detection section 40 which detects at least one of the first feature and second feature from the captured workpiece image based on the stored first feature and second feature, a feature position calculation section 41 which calculates the position of at least one of the detected first feature and second feature, and a target position calculation section 42 which calculates, when the first feature can be detected from the workpiece image, the target position of the robot 11 based on the detected position of the first feature and the stored first positional relationship, calculates, when the first feature cannot be detected from the workpiece image and the second feature can be detected from the workpiece image, the position of the first feature based on the calculated position of the second feature and the stored second positional relationship, and calculates the target position of the robot 11 based on the calculated position of the first feature and the stored first positional relationship. Note that in the robot system 1 according to the first embodiment, when the first feature cannot be detected from the workpiece image and the second feature can be detected from the workpiece image, the target position calculation section 42 calculates the target position of the robot 11 based on the calculated position of the second feature and the stored first positional relationship.

The image processor 20 further includes a feature posture calculation section 43 which calculates the posture of at least one of the detected first feature and second feature, and a target posture calculation section 44 which calculates, when the first feature can be detected from the workpiece image, a target posture of the robot 11 based on the calculated posture of the first feature and the stored first postural relationship, calculates, when the first feature cannot be detected from the workpiece image and the second feature can be detected from the workpiece image, the posture of the first feature based on the calculated posture of the second feature and the stored second postural relationship, and calculates the target posture of the robot 11 based on the calculated posture of the first feature and the stored first postural relationship. Note that in the robot system 1 according to the first embodiment, when the first feature cannot be detected from the workpiece image and the second feature can be detected from the workpiece image, the target posture calculation section 44 calculates the target posture of the robot 11 based on the calculated posture of the second feature and the stored first postural relationship.

The image processor 20 further includes a second positional relationship calculation section 45 which calculates the aforementioned second positional relationship and storing the second positional relationship in the third memory 32 in advance, and a second postural relationship calculation section 46 which calculates the aforementioned second postural relationship and storing the second postural relationship in the fourth memory 33 in advance. Note that in the robot system 1 according to the first embodiment, the second positional relationship calculation section 45 and the second postural relationship calculation section 46 may not be included.

Figure 9:
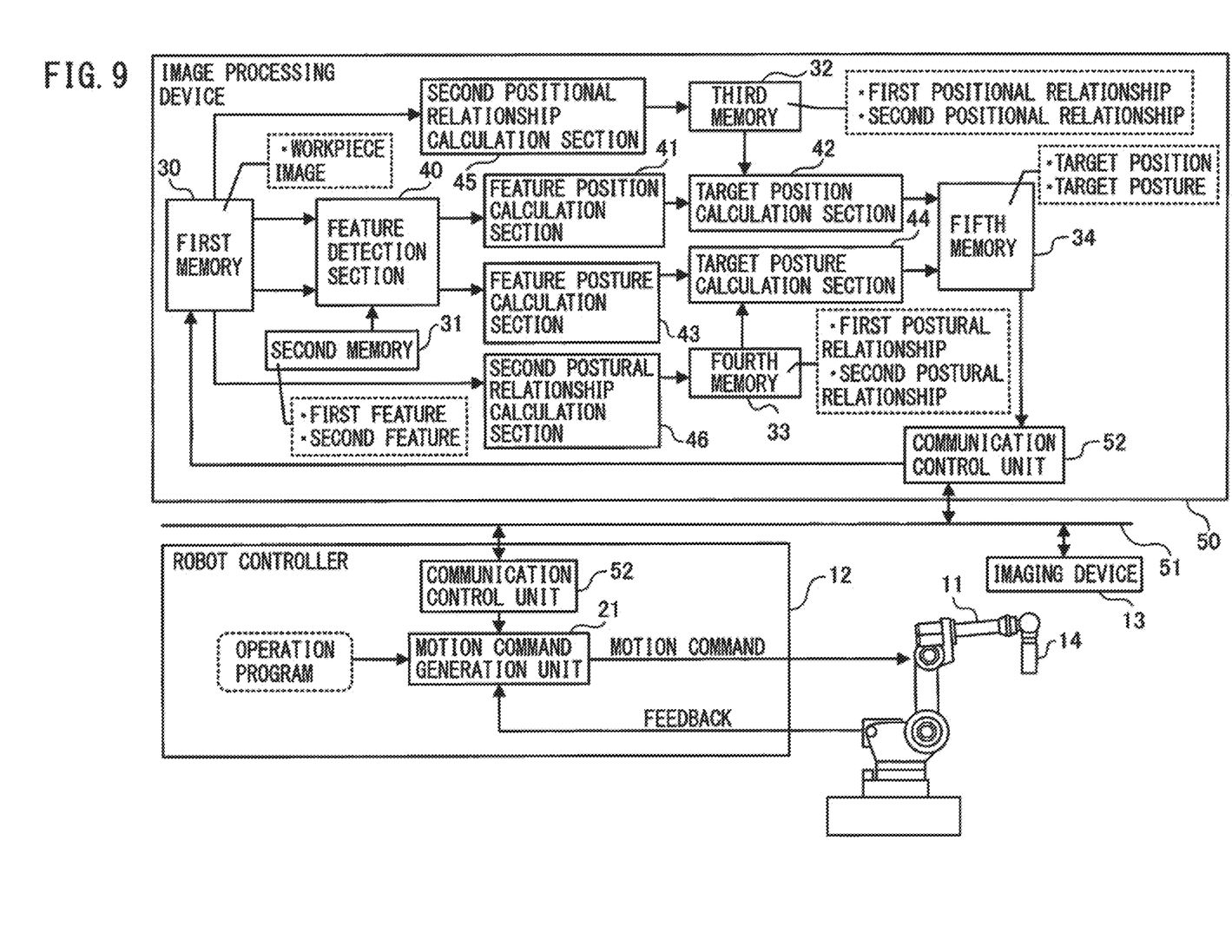
FIG. 9 is a block diagram showing the configuration of the robot system according to yet another embodiment.

FIG. 9 is a block diagram showing the configuration of the robot system 1 according to yet another embodiment. The robot system 1 according to the yet another embodiment includes an image processing device 50 which is communicatively connected to the robot controller 12 via a wired or wireless network 51. The image processing device 50 corrects the teaching of the robot using image processing. Each of the robot controller 12 and the image processing device 50 includes a communication control unit 52 which controls communication. The image processing device 50 may be a computer such as a PC. The other structures of the image processing device 50 are the same as those of the image processor 20 shown in FIG. 8, and thus, an explanation thereof has been omitted.

According to the aforementioned embodiments, when a plurality of workpiece features have been prepared and one of the features cannot be detected from a captured image, since another feature can be detected, the teaching of the robot can be simplified while increasing the workpiece feature detection rate.

The programs which executes the above-described flowcharts may be recorded on a non-transitory computer-readable, recording medium such as a CD-ROM.

Though various embodiments have been described in the present specification, the present invention is not limited to the aforementioned embodiments. It is deemed that various modifications can be made within the scope of the following claims.

The invention claimed is:

1. A robot system, comprising a robot configured to perform an operation on a workpiece, a robot controller configured to control the robot, and an imaging device configured to capture an image of the workpiece, wherein the robot system is configured to detect features of the workpiece from the captured image and correct teaching of the robot based on detection results, the robot system further comprising:
    a storage unit configured to store, in advance,
        a first feature and a second feature of the workpiece,
        a first positional relationship of a position of the first feature with a target position of the robot, and
        a second positional relationship between the position of the first feature and a position of the second feature,
    a feature detection section configured to detect at least one of the first feature and the second feature from the captured image based on the stored first feature or second feature,
    a feature position calculation section configured to calculate the position of at least one of the detected first feature and second feature, and
    a target position calculation section configured to
        calculate, when the first feature can be detected from the image, the target position of the robot based on the calculated position of the first feature and the stored first positional relationship, and
        calculate, when the first feature cannot be detected from the image and the second feature can be detected from the image, the position of the first feature based on the calculated position of the second feature and the stored second positional relationship, and further calculate the target position of the robot based on the calculated position of the first feature and the stored first positional relationship.

2. The robot system according to claim 1, wherein the storage unit is further configured to store a first postural relationship of a posture of the first feature and a posture of the second feature with a target posture of the robot, the robot system further comprising:
    a feature posture calculation section configured to calculate a posture of at least one of the detected first feature and the detected second feature, and
    a target posture calculation section configured to
        calculate, when the first feature can be detected from the image, a target posture of the robot based on the calculated posture of the first feature and the stored first postural relationship, and
        calculate, when the first feature cannot be detected from the image and the second feature can be detected from the image, a target posture of the robot based on the calculated posture of the second feature and the stored first postural relationship.

3. The robot system according to claim 2, wherein the storage unit is further configured to store a second postural relationship between the posture of the first feature and the posture of the second feature, and
    the target posture calculation section is configured to, when the first feature cannot be detected from the image and the second feature can be detected from the image,
        calculate the posture of the first feature based on the calculated posture of the second feature and the stored second postural relationship, and further calculate a target posture of the robot based on the calculated posture of the first feature and the stored first postural relationship.

4. The robot system according to claim 3, further comprising a postural relationship calculation section configured to calculate the second postural relationship and store the second postural relationship in the storage unit in advance.

5. The robot system according to claim 1, further comprising a positional relationship calculation section configured to calculate the second postural relationship and store the second postural relationship in the storage unit in advance.

6. The robot system according to claim 1, wherein the robot comprises a hand including a vacuum gripper or a magnetic force gripper.

7. The robot system according to claim 1, wherein the robot comprises a hand including finger members.

8. The robot system according to claim 1, wherein the robot controller is configured to correct the teaching of the robot using image processing.

9. The robot system according to claim 1, further comprising an image processing device which is wired or wirelessly communicatively connected with the robot controller, wherein the image processing device is configured to correct the teaching of the robot using imaging processing.

* * * * *